United States Patent
Garrott

[15] 3,652,937
[45] Mar. 28, 1972

[54] SPEED AND FAULT INDICATOR FOR A MODEL VEHICLE

[72] Inventor: William L. Garrott, 2119 S.W. 44th Avenue, Gainesville, Fla. 32601

[22] Filed: Nov. 2, 1970

[21] Appl. No.: 86,255

Related U.S. Application Data

[63] Continuation-in-part of Ser. No. 795,176, Jan. 30, 1969, abandoned.

[52] U.S. Cl. ............................. 324/168, 324/177, 246/182, 104/149
[51] Int. Cl. ........................................................ G01p 3/48
[58] Field of Search .................... 324/168, 177; 104/60, 149; 273/86.2, 86; 246/182 A

[56] References Cited

UNITED STATES PATENTS 3,346,725  10/1967  Allured .............................. 324/177 X

FOREIGN PATENTS OR APPLICATIONS 704,644  3/1965  Canada ................................. 324/168

OTHER PUBLICATIONS

L. H. Westcott– How to Wire Your Model Railroad– 5th Ed.– 1959– pp. 83, 86.

*Primary Examiner*—Michael J. Lynch
*Attorney*—Cameron, Kerkam & Sutton

[57] ABSTRACT

A visual indicator is provided which monitors the operating conditions of a model track system having electrically propelled vehicles and simultaneously provides an indication of the speed of the vehicle on the trackway and of any faulty conditions that may exist along the tracks. A semiconductor transistor circuit separates ripple voltage produced by commutation in the electrical motor that propels the vehicle from the full wave rectified voltage of the energizing source of the model system. Operation of the transistor circuit in response to ripple voltage drives a meter instrument calibrated to indicate speed of the vehicle, while deflections due to faults provide an indication of a fault at the location of the vehicle on the track.

10 Claims, 5 Drawing Figures

INVENTOR
WILLIAM L. GARROTT

SPEED AND FAULT INDICATOR FOR A MODEL VEHICLE

The present application is a continuation-in-part of my copending application Ser. No. 795,176 filed Jan. 30, 1969, now abandoned.

DESCRIPTION OF THE PRIOR ART

Various methods have been devised for measuring the scale speed of a model railway train in miles per hour or other suitable units. Such methods may employ a miniature AC generator attached to the shaft of the machine which is to have its speed measured. The AC voltage produced by the generator provides a signal proportional to speed, and this voltage is used to actuate a suitable indicating mechanism. Other methods may employ other forms of accessory equipment such as a photo cell pickup in combination with a light source. The use of accessory equipment is minimized by the present invention which utilizes the ripple voltage produced by commutation in electrical rotating equipment to provide a control signal for actuating a control or an indicating device.

A typical form of speed indicator known in the prior art is disclosed in Canadian Pat. No. 704,644 issued on Mar. 2, 1965 to Henry E. Martin. Reference may also be made to U.S. Pat. No. 3,346,725 which discloses another form of circuit adapted to measure the speed of the rotor of a rotating device. With respect to known circuits of the type adapted to measure faults, reference may be made to the publication "How to Wire Your MOdel Railroad", L.H. Westcott, pp. 83 and 86, 5th edition, 1959; however, such fault measuring circuits have generally been limited to systems which measure continuity and do not continuously monitor the system while simultaneously measuring and indicating speed.

While the invention has application in various environments where it is desired to develop a control signal in response to the voltage produced by commutation in either direct current or alternating current rotating equipment, in the interest of brevity, the invention will be described in connection with its application as a speed and fault indicator system for model railway systems wherein a visual indication of scale speed of the train being operated on the tracks is provided together with an observable indication of faults which may occur along the tracks.

A primary object of the present invention is to provide an electrical circuit which establishes a control voltage in response to the ripple voltage produced by commutation in electric rotating equipment.

Another object of the present invention is to provide an electrical circuit for driving a visual indicator upon erratic behavior or the presence of faults such as poor connections, track or rail gaps or oxidized surfaces on the tracks in model electrical train or car systems.

A further object of the present invention is to provide an improved circuit for measuring the speed of model trains or model cars which employ electrical motors for their propulsion.

These and other objects of the present invention and the attendant advantages will become apparent from the following description taken in conjunction with the accompanying drawings wherein.

Figure 1:
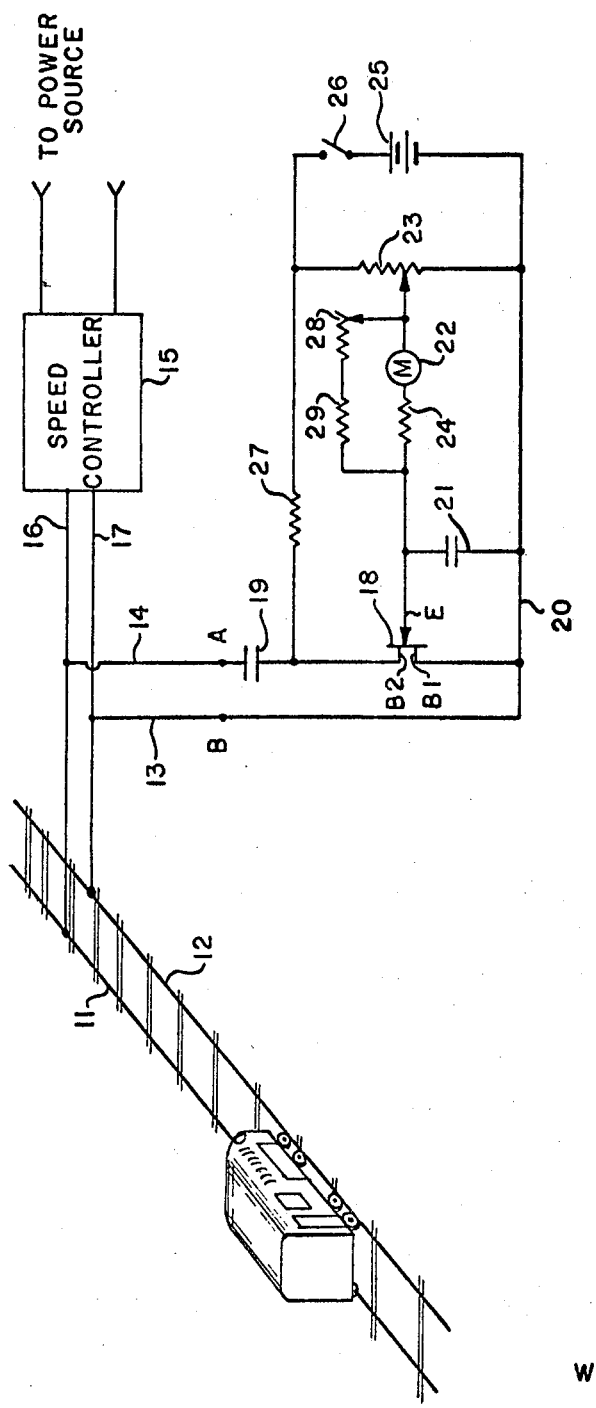
FIG. 1 is a schematic of an electrical indicator circuit embodying the present invention in one form thereof.
Figure 3:
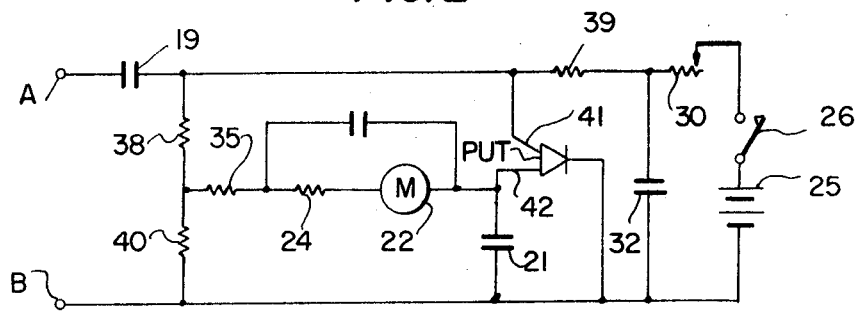
Figure 4:
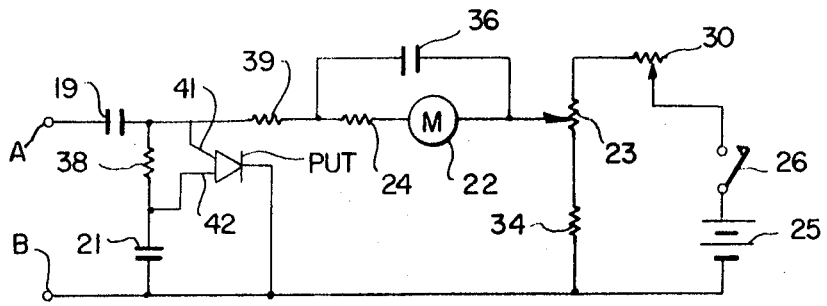
Figure 5:
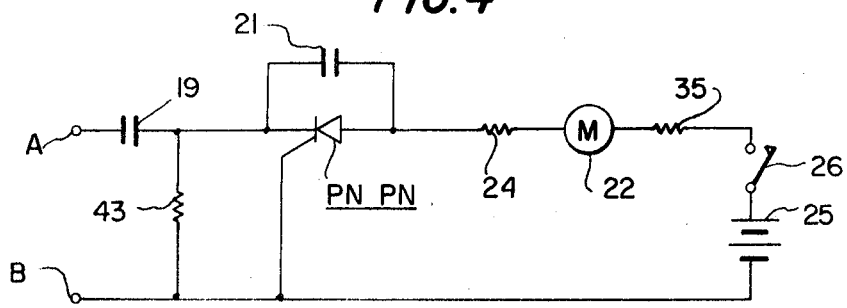

FIGS. 3 and 4 are improved versions of the circuit shown in FIG. 1 and utilize PNPN devices as the semiconductor control elements in the transistor circuits; and FIG. 5 is a variation of the circuit shown in FIG. 1 and utilizes a PNPN device of the silicon control rectifier type as the semiconductor control element of the circuit instead of the programmable unijunction transistor illustrated in FIGS. 3 and 4.

In the drawings, like reference characters are used to represent components having like functions throughout the several circuit variations illustrated by the drawings.

Referring now to FIG. 1, reference character 10 identifies generally the electrical circuit of the present invention adapted to separate the signal or electrical impulses caused by commutation in the propulsion motor of a model electric railway system. Conventionally, model electric trains are propelled by DC motors in which commutation in the motor produces a ripple voltage which modulates the DC energizing signal. Since the manner of energizing such systems is well known, a detailed description thereof will not be given.

Circuit 10 is connected to the two conductors 11 and 12 forming the tracks of the model railway systems through conductors 13 and 14, connection being made such that speed controller 15 of the model system is between these connections and the power source used to operate the models. These connections may be made at the location where power is applied to the tracks or at any point along the track or, as shown, at any suitable point along conductors 16 and 17. If desired, as the case may be with silicon controlled rectifier power sources, the speed controller 15 may be combined with the power source, in which case a small impedance of approximately 5 to 10 ohms is inserted in series with line 16 in a position normally occupied by the impedance of the speed controller for assuring an adequate input signal at the connection points.

As hereinbefore described, due to the commutating action in the propulsion motor of the model train, a composite signal is applied across lines 13 and 14. This signal comprises a pulsating DC voltage component (rectified AC voltage), modulated by a second component corresponding to the electrical impulses generated due to commutation. In accordance with the present invention, the pulsating DC voltage component is removed from the composite signal by a circuit employing the diode characteristic of a unijunction transistor. The composite signal is applied across circuit input terminals A, B.

Referring to FIG. 1, a smoothing capacitor 19 is connected between terminals A and the base electrode B2 of the unijunction transistor 18. Base electrode B1 of unijunction transistor 18 is connected through a common bus or ground return line 20 and connection point B to conductor 13. The emitter electrode E of the unijunction transistor is returned through capacitor 21 to ground return line 20. The junction of emitter electrode E and capacitor 21 is connected in series with a control element 22 to the adjustable tap of voltage divider 23.

Voltage divider 23 is connected across the circuit supply source 25 and is adjustable to set the voltage at the emitter of the unijunction transistor to a value slightly less than that value which causes the unijunction to fire the system. A manually operable single pole, single throw switch 26 may be placed in series with the supply source 25 to enable an operator to selectably connect and disconnect the circuit from the railway system. A biassing resistor 27 is connected between base B2 of the unijunction transistor and power source 25.

If control element 22 is a meter, rheostat 28 and resistor 29 may be added across the meter. Rheostat 28 permits adjustment and calibration of the meter current to insure that deflection provides an accurate indication of speed. Resistor 24 represents the internal resistance of the meter.

Resistor 29 allows a smooth adjustment and a limit to the adjustment of the current shunted around the meter. Resistor 29 also restricts the variation of the effective impedance of the meter and a shunting circuit formed by resistors 29 and 28 to insure uniform operation of the unijunction 18.

In operation, as the model train is "driven" across the tracks 11 and 12, a composite signal is derived across conductors 13 and 14 and applied to input terminals A, B. The composite signal comprises a pulsating DC voltage modulated by electrical impulses or a ripple voltage signal caused by the commutation in the train motor. Capacitor 19 and unijunction transistor 18 operate to separate the commutator produced signals of the electric motor in the model train from the wave form of the power source voltage used to power the motor. To this end, the unijunction transistor is biased to perform as a linear resistance, shunted by the equivalent resistance of the other circuit components. So long as the emitter is reversed biased, only a small emitter leakage current will flow. The ripple voltage signal provides a turn-on gate which drops the voltage at the B2 electrode causing the transistor to fire. It should be noted that the unijunction transistor forms a portion of the circuit which separates the signal used to trigger the transistor. Because of this unique operation, no frequency selector or pulse sensing and shaping circuit is required between the signal source and the input terminals A and B of circuit 10.

Each time unijunction transistor 18 fires, capacitor 21 discharges through the circuit formed by the emitter and B1 electrodes. Recharging of capacitor 21 occurs through the meter circuit. If the recharge pulses are all of equal duration, the average meter current reading is directly proportional to the number of commutator produced pulses or r.p.m. of the motor. By appropriate calibration of the meter scale, speed can be observed directly.

A fault or poor connection in the system such as a gap in the tracks or rails or oxidized surfaces results in a dip or rapid deflection of the meter indicator needle and provides immediate indication of a faulty condition. The magnitude of the deflection away from normal deflection being obtained at that time indicates the severity of the problem. By simultaneously observing the model as it is operating and the monitoring meter, the exact location of a fault can be pin pointed.

Figure 2:
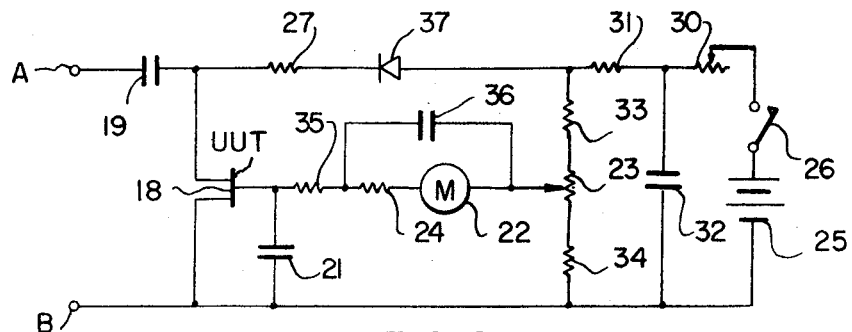
FIG. 2 is an electrical indicator circuit embodying the present invention and may be considered to be an improved version of the circuit shown in FIG. 1.

Referring now to FIG. 2, there is illustrated a modified circuit arrangement for a speed indicator embodying the present invention adapted to provide increased sensitivity. To this end, a variable resistor 30 is provided in series with control switch 26 and power supply 25. Resistor 35 regulates the sensitivity of the circuit and is advantageously set to apply maximum potential to the measuring circuit to allow the meter to be read at its optimum scale calibration. Resistor 31 in series with resistor 30 serves to limit maximum peak current during charging of capacitor 21 and together with capacitor 32 provides an input filter for smoothing ripple that may be present from the input supply. Resistor 31 also serves to improve trigger dependability of the unijunction transistor 18.

A similar effect can be accomplished by providing resistors 33 and 34 in series with potentiometer 23 as part of the voltage divider which sets the voltage to be applied to the emitter of the unijunction transistor. Resistors 33 and 34 provide the conventional function of increasing the sensitivity of control potentiometer 23.

A further improvement in meter sensitivity may be obtained by employing resistor 35 in series with meter 22. The resistance of resistor 35 would normally be much greater than that of the meter resistance 24, and reduces the effect of the inductance of the meter coil circuit on meter sensitivity, and permits the use of smoothing capacitor 36 across the meter circuit. As a practical matter, however, in most applications, use of resistor 31 provides sufficient stability and smoothing of meter response in response to non-uniform input signals so as to make the addition of components 33–36 a matter of economic choice, particularly when the economics of a situation dictate manufacture of the speed indicator at a minimum expense.

Diode 37 is connected in series with resistor 27 to provide a constant potential at the emitter junction of the unijunction transistor with variations in voltage across capacitor 32 and thereby improve trigger dependability. Diode 32 works in the linear region if its characteristic curve where the slope is steep so that there is little change in potential with variation of current through the diode. Thus, diode 37 serves as a constant potential drop. The proper diode voltage is preferably calculated for any variation of the supply voltage at the junction of resistors 30, 31 and capacitor 32 to keep the unijunction transistor just below its firing potential. Without this compensation, the unijunction transistor will always fire if the potentiometer 23 is adjusted to provide a specific voltage at the emitter junction, and then the supply voltage across capacitor 32 is raised.

Referring now to FIG. 3, there is disclosed a circuit arrangement in which a programmable unijunction transistor (PUT) is used in place of the unijunction transistor. The PUT is a PNPN device which can be programmed to unijunction characteristics with its gate electrode connected to the junction of two series connected programming resistors which control the voltage at which the anode to gate becomes forward biased. After the anode-to-gate junction conducts, the regeneration inherent in the PNPN device causes the PUT to switch on. This generates a negative resistance characteristic from anode-to-cathode similar to that for a unijunction transistor. Technical details of PUT devices may be obtained from the publication General Electric. Electronic Innovations in Action, Semiconductor, 60.20 11/67 related to programmable unijunction transistors.

The circuit arrangement of FIG. 3 is an improvement over those of FIGS. 1 and 2 in that it requires no adjustments and no compensation for proper functioning. Resistor 30 provides an initial calibration control, but even this can be avoided with proper selection of a suitable power supply source 25. In operation, the PUT is used to discharge capacitor 21 in accordance with the frequency rate of the commutation signal appearing across terminals A–B and coupled to the circuit through capacitor 19. After each discharge, capacitor 21 charges through the meter circuit and the programming resistors 38 and 39. The charge path can be traced from capacitor 21 through meter 22, resistors 24, 35, 38, 39 and 30, the closed contacts of switch 26, power source 25 and back to capacitor 21. The meter serves to monitor capacitor charging current and is deflected proportional to the frequency of the incoming triggering signal.

By using a single potential divider comprising programming resistors 38, 39 and series resistance 40, and connecting the anode gate electrode 41 to the top of resistor 38, i.e., to a higher potential than that of the anode 42 connected to the junction of resistors 38 and 40, maximum simplicity is achieved while operation of the circuit is completely dependable. Further, this arrangement insures the utmost in stability, because the feedback network insures that no potential change within the circuit can place the anode gate at a lower potential than the anode, i.e., an external signal is required to trigger the circuit. Such an arrangement removes the necessity of an adjustment for the "intrinsic ratio" as required in most unijunction circuits.

In the illustrated circuit of FIG. 3, a "trigger" is applied at the anode gate 41. The trigger potential could be applied at a different point on the voltage divider than as illustrated if it were necessary to match the impedance of the signal source, because capacitor 21 and series resistor 35 maintain the anode at a nearly constant potential during the time short duration pulses are applied.

FIG. 4 illustrates a rearrangement and improvement of the circuit illustrated in FIG. 3, and is specifically designed for measuring the speed of model locomotives and slot cars. The feedback scheme for the PUT permits the circuit to function without the presence of the large input filter capacitor 32 at a reduced level due to a lesser potential. The impedance required for proper functioning of the PUT is placed in the impedance branch connected to the arm of the potential divider to provide maximum sensitivity. Resistor 38 performs the necessary operation of holding the PUT in an OFF state until triggered by the input commutation signal applied across terminals A–B. When capacitor 21 charges, the charging current raises the potential at the anode gate of the PUT with respect to the anode and thus tends to over-ride signals injected through capacitor 19 until the capacitor is nearly charged. This provides for uniform operation.

The PUT is switched ON to discharge capacitor 21 by applying a negative going signal between the anode gate and the cathode that momentarily lowers the anode gate potential to a value below that of the gate potential. After capacitor 21 is discharged the high initial recharging current through resistor 38 insures that the PUT will stay in the OFF mode. Smooth deflection of the pointer of the meter is secured from input signals of a few cycles to a few thousand cycles and limitations are established only by the switching time of the device and distributed capacitance of the circuit.

A further variation of the speed and fault indicating circuit of FIGS. 1–4 is illustrated in FIG. 5 wherein a PNPN device is employed which has the gate at the cathode end. Such devices are commonly known as Thyristors or silicon controlled rectifiers (SCRs).

It should be noted that in the previously described circuits, the interconnection between the power supplied across the circuit and the signal source could place an impedance in the circuit in such a manner as to affect the response. The circuit arrangement of FIG. 5 has an inherent isolation between the input and the remainder of the circuit. Because isolation is achieved between the input and the signal source, the circuit is not disturbed by external connections. Timing capacitor 21 is connected across the anode-cathode junction of the PNPN device which has its cathode-gate junction connected across resistor 43. Resistor 43 keeps the PNPN device at cut-off until the timing capacitor is charged. The circuit is self-limiting in that as the frequency of the trigger pulse increases, a point is reached where capacitor 21 does not fully charge. A larger signal is then required to fire the PNPN device.

Thus, there has been described several simple, efficient and economic circuits to measure the speed of model trains or cars which employ electrical motors for their propulsion. The invention has been described in accordance with several embodiments of the invention, and it will be readily apparent to those skilled in the art that various changes and modifications may be made in the details thereof without departing from the true spirit and scope of the invention as defined by the appended claims.

I claim:

1. A fault and speed indicator for a model electric railway system comprising a two rail conductor track, means for applying a DC voltage to the track, a DC motor driven model vehicle adapted to be positioned for movement along the track in response to the applied DC voltage, means electrically connecting the DC motor to the track for energization through the track to thereby develop a composite signal comprising a pulsating DC voltage modulated by electrical impulses caused by commutation in the motor, a pair of line conductors each being electrically connected at one end to one of the tracks for picking off the composite signal, circuit means having an input and an output and being operable to separate the combined components of said signal to thereby develop a control signal corresponding to commutation in the motor, said input being connected to the other end of the line conductors, said control signal being present at the output to provide a signal indicative of speed and faulty conditions along the track and an indicator circuit connected to the output for monitoring the control signal to provide a continuous indication of the speed of the vehicle and faulty conditions along the track.

2. A fault and speed indicator for an electric motor driven model vehicle as set forth in claim 1 wherein said circuit means includes a switching semiconductive device operably connected to develop said control signal in response to the rate at which said semiconductive device is fired.

3. A fault and speed indicator as set forth in claim 1 wherein said circuit means comprises a unijunction transistor and a capacitor operably connected to separate the commutation produced electrical impulses from the pulsating DC voltage.

4. A fault and speed indicator as set forth in claim 3 wherein said indicator circuit includes a capacitor and a meter circuit, said capacitor being connected to be charged through the meter circuit and to be discharged through the unijunction transistor.

5. A fault and speed indicator as set forth in claim 2 wherein said circuit means further includes a capacitor connected to said semiconductive device and having a discharge path through said semiconductive device and a charge path through said indicator.

6. A fault and speed indicator as set forth in claim 3 wherein said semiconductive device is a unijunction transistor biased to perform as a linear resistance and forms part of the circuit which separates the signal components.

7. In a fault and speed indicator for an electric motor driven model vehicle adapted to be driven along a two rail conductor track, said motor driven model vehicle being operatively energized through the track, means for applying a DC voltage to the track for energizing the driving motor of the model vehicle such that the motor develops a signal, said signal comprising a first component developed by commutation in the motor and corresponding to speed of the vehicle along the track and a second component corresponding to the applied DC voltage, said first component modulating the second component, the improvement comprising an indicator responsive to a control signal for providing a continuous indication corresponding to speed of the vehicle and faulty conditions along the track, circuit means for separating the combined components of said signal to thereby develop the control signal in response to said first component, said indicator being operably connected to said circuit means and means connecting said circuit means to said track for monitoring the speed of the vehicle and faulty conditions along the track.

8. A fault and speed indicator for an electric driven model vehicle as set forth in claim 7 wherein said circuit means includes a switching semiconductive PNPN device operably connected to develop said control signal in response to the rate at which said PNPN device is fired.

9. A fault and speed indicator as set forth in claim 8 wherein said PNPN device is a thyristor.

10. A fault and speed indicator as set forth in claim 8 wherein said PNPN device is a programmed unijunction transistor.

* * * * *